United States Patent [19]

Kawasaki

[11] Patent Number: 5,082,353

[45] Date of Patent: Jan. 21, 1992

[54] LIQUID-CRYSTAL DISPLAY APPARATUS

[75] Inventor: Kazuo Kawasaki, Hyogo, Japan

[73] Assignee: Kabushiki Kaisha Toshiba, Kawasaki, Japan

[21] Appl. No.: 348,422

[22] Filed: May 8, 1989

[30] Foreign Application Priority Data

| May 11, 1988 | [JP] | Japan | 63-112506 |
| May 30, 1988 | [JP] | Japan | 63-130378 |
| May 31, 1988 | [JP] | Japan | 63-131415 |
| Feb. 20, 1989 | [JP] | Japan | 1-38231 |

[51] Int. Cl.$^5$ .............................................. G02F 1/13
[52] U.S. Cl. ...................................... 359/63; 359/79; 359/93
[58] Field of Search ............... 350/337, 347 E, 347 R, 350/339 R, 341, 346, 335

[56] References Cited

U.S. PATENT DOCUMENTS

| 3,900,248 | 8/1975 | Nagasaki | 350/347 R |
| 4,232,948 | 11/1980 | Shanks | 350/347 R |
| 4,239,349 | 12/1980 | Scheffer | 350/337 |
| 4,443,065 | 4/1984 | Funada et al. | 350/347 R |
| 4,844,569 | 7/1989 | Wada et al. | 350/335 |
| 4,852,976 | 8/1989 | Suzuki | 350/339 R |
| 4,973,137 | 11/1990 | Kazaki | 350/339 R |
| 4,984,874 | 1/1991 | Yamamoto | 350/337 |

FOREIGN PATENT DOCUMENTS

| 0246842 | 11/1987 | European Pat. Off. |  |
| 0284372 | 9/1988 | European Pat. Off. | 350/347 R |
| 0073525 | 4/1985 | Japan | 350/347 R |
| 0261722 | 11/1986 | Japan | 350/334 |
| 0274925 | 11/1988 | Japan | 350/347 R |

OTHER PUBLICATIONS

Kotani et al., "Effect of Various Parameters on Matrix Display Characteristics of SBE Liquid-Crystal Cells", Proceedings of the Society for Information Display (SID), vol. 28, No. 2, 1987, pp. 149-154.
Nonemissive Electrooptic Displays edited by A. R. Kmetz and F. K. von Willisen, pp. 59-65.

Primary Examiner—Rolf Hille
Assistant Examiner—Tan Ho
Attorney, Agent, or Firm—Cushman, Darby & Cushman

[57] ABSTRACT

A liquid-crystal display apparatus comprising two substrates opposing each other and having electrodes formed on the opposing surfaces, at least one of the electrodes being transparent, a nematic liquid crystal layer interposed between the substrates and having pre-tilt angle $\theta$ of greater than 1° with respect to the surfaces of the substrates, and having a twisting angle of 180° to 360° from the first substrate to the second substrate, a first polarizer arranged on that side of the first substrate which faces away from the electrode formed thereon, a second polarizer arranged on that side of the second substrate which faces away from the electrode formed thereon, and an optical retardation member or a combination of an optical retardation member and a quarter-wave plate, each located between the polarizers. The value of $R = \Delta n \cdot d \cos^2 \theta$ ranges from 0.4 to 0.8, where $\Delta n$ is the optical anisotropy of the nematic liquid crystal material, d ($\mu$m) is the thickness of the liquid crystal layer, and $\theta$ is the pre-tilt angle of the liquid crystal material. The value of $R' = \Delta n' \cdot d'$ ranges from 0.22+0.55 m to 0.42+0.65 m, or from 0.47+0.55 m to 0.67+0.65 m (m=0, 1, or 2), where $\Delta n'$ is the optical anisotropy of the optical retardation member and d' ($\mu$m) is the thickness of the optical retardation member. Owing to the optical retardation member located between the polarizers, and also to the specific values of R and R', the apparatus can perform high-quality monochrome display with great background whiteness and high image contrast.

19 Claims, 4 Drawing Sheets

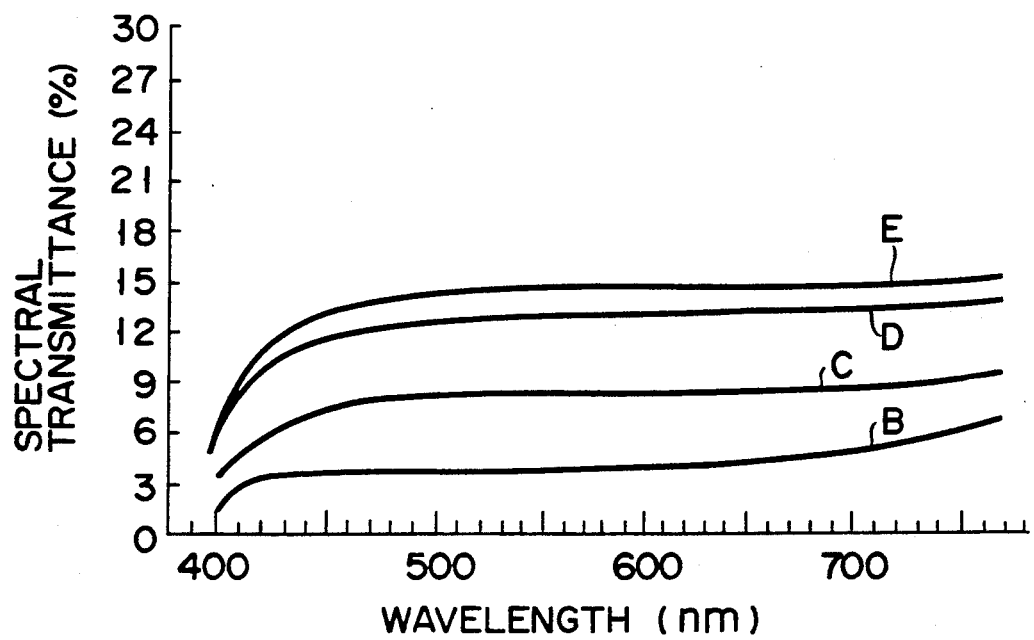
F I G. 3
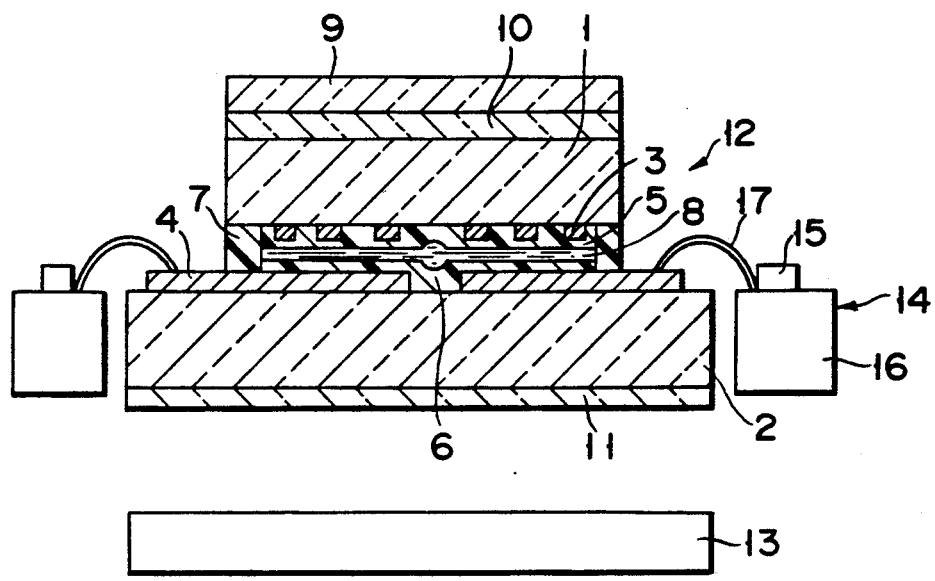
F I G. 4

LIQUID-CRYSTAL DISPLAY APPARATUS

BACKGROUND OF THE INVENTION

1. Field of the Invention

The present invention relates to a liquid-crystal display apparatus of a birefringence-control type.

2. Description of the Related Art

Various liquid-crystal display apparatuses are known, classified in accordance with their operating modes. Among them are: a TN (twisted nematic) type, a DS (dynamic scattering) type, a GH (guest-host effect) type, a DAP (deformation of vertical aligned phases) type, and a thermally writing type. Of these types of the liquid-crystal display apparatuses, the TN type is used in various devices such as wrist watches, hand-held calculators, and measuring devices. The TN liquid-crystal display apparatus has neither an image contrast nor a view angle range great enough to provide a display screen which is as large and can display as much data as is demanded at present. Accordingly, it has been greatly demanded that a liquid-crystal display apparatus of a new operating mode be developed which can have an adequate image contrast and a sufficiently wide view angle.

In recent years, a liquid-crystal display apparatus, which meets this demand, has been invented. This is known as the birefringence-control type. Japanese Patent Disclosure No. 60-107020 discloses an SBE (super-twisted, birefringence effect) liquid-crystal apparatus which is one type of a birefringence-control liquid-crystal display apparatus. The birefringence-control liquid-crystal display apparatus comprises a pair of parallel transparent substrates opposing each other, electrodes formed on the opposing surface of the substrate, at least one of the electrodes being transparent, and a seal member sealing the periphery of the substrates, thus defining a cell. The cell is filled with nematic liquid crystal such as a cyclohexane-based one, an ester-based one, a biphenyl-based one, or a pyrimidine-based one. The nematic liquid crystal contains chiral agent, which twists the axes of the liquid-crystal molecules by 180° to 360°, from one substrate to the other substrate. The axes of the liquid-crystal molecules are pre-tilted at an angle greater than 5° to the surfaces of the substrates, by means of the two crystal-orientating layers formed on the opposing surfaces of the substrates.

In the case of an SBE liquid-crystal display apparatus wherein the axes of the liquid-crystal molecules are twisted by 270°, two polarizers are arranged on the outer sides of the substrates, which face away from said opposing surfaces. The structure considered best suited for this SBE liquid-crystal display apparatus is two-fold. First, one polarizer (hereinafter called "front polarizer"), which is arranged on the front side of the liquid crystal cell, has a light-transmitting axis inclined clockwise at about 30° with respect to the direction in which the liquid-crystal molecules are orientated on the front side substrate. Secondly, the other polarizer (hereinafter called "rear polarizer"), which is arranged on the rear side of the liquid crystal cell, has a light-transmitting axis inclined either counterclockwise at about 30° or clockwise at about 60°, to the direction in which the liquid-crystal molecules are orientated on the rear side substrate. When the light-transmitting axis of the rear polarizer is inclined counterclockwise at about 30° with respect to the molecule-orientating direction of the rear side substrate, the liquid crystal assumes yellow mode, i.e., a bright yellow display is obtained in a non-selective state, and a black display is obtained in a selective state. On the other hand, when the light-transmitting axis of the rear polarizer is inclined clockwise at about 60° with respect to the molecule-orientating direction of the rear side substrate, the liquid crystal assumes blue mode, i.e., a deep blue display is obtained in a non-selective state and a transparent display is obtained in a selective state. In any other birefringence-control liquid-crystal display apparatus, the background of the display screen is not achromatic color.

The inventors hereof have proposed that the background of the display screen be colorless. (See Japanese Patent Disclosure No. 1-514). More precisely, the inventors invented a SBE liquid-crystal display apparatus, wherein the value of R ranges from 0.3 to 0.7, R being $\Delta n \cdot d \cdot \cos^2\theta$, where d is the thickness of the layer of the nematic liquid crystal, $\Delta n$ is the optical anisotropy of the nematic liquid crystal, and $\theta$ is the pre-tilt angle of the liquid-crystal molecules. Because of the value of R, falling within this specific range, both the spectrum in the field-on state and the field-off state are almost horizontally linear, whereby the apparatus can perform a high-quality monochrome display.

However, even if the value of R falls within the range of 0.3 to 0.7, the liquid-crystal display apparatus cannot have adequate image contrast, sufficient whiteness, or sufficient transmittance. When the apparatus is used as a light-transmission type and back-lighted, its display assumes some color if adequate contrast is maintained, and conversely, its display image fails to have adequate contrast if satisfactory whiteness is maintained.

SUMMARY OF THE INVENTION

Accordingly, the object of the present invention is to provide a liquid-crystal display apparatus which provides sufficient whiteness and high contrast and can therefore perform ideal monochrome display.

According to the present invention, there is provided a liquid-crystal display apparatus comprising first and second substrates opposing each other and having electrodes formed on the opposing surfaces, at least one of the electrodes being transparent; a layer of nematic liquid crystal interposed between the first and second substrates and having pre-tilt angle $\theta$ of greater than 1° with respect to the surfaces of the first and second substrates, and having a twisting angle of 180° to 360° from the first substrate to the second substrate; a first polarizer arranged on that side of the first substrate which faces away from the electrode formed thereon; a second polarizer arranged on that side of the second substrate which faces away from the electrode formed thereon; and an optical retardation member or a combination of an optical retardation member and a quarter wave plate, located between the first and second polarizers, wherein the value of $R = \Delta n \cdot d \cdot \cos^2\theta$ ranges from 0.4 to 0.8, where $\Delta n$ is the optical anisotropy of the nematic liquid crystal, d (μm) is the thickness of the layer of the liquid crystal, and $\theta$ is the pre-tilt angle of the liquid crystal, and the value of $R' = \Delta n' \cdot d'$ ranges from $0.22 + 0.55m$ to $0.42 + 0.65m$, or from $0.47 + 0.55m$ to $0.67 + 0.65m$ (m = 0, 1, or 2), where $\Delta n'$ is the optical anisotropy of the optical retardation member and d' (μm) is the thickness of the optical retardation member.

The optical retardation member incorporated in the liquid-crystal display apparatus has the function of a so-called optical retardation plate, and is an optical retardation plate in most cases. Usually, the optical retardation member is interposed either between the first polarizer and the first substrate, or between the second polarizer and the second substrate.

Most optical retardation plates are for example elongated polymeric film.

A half wave plate can be combined with the optical retardation plate.

The twisting angle of the liquid crystal preferably ranges from 210° to 270°.

The value of the pre-tilt angle $\theta$ is the average of the pre-tilt angles of all molecules which form the liquid crystal layer.

The value of R $(= \Delta n \cdot d \cdot \cos^2 \theta)$ is closely related to the color of display achieved by the liquid-crystal display apparatus. The experiments the inventor hereof have conducted shows that, when R is over 0.8, the liquid crystal cell will exhibit a high spectral reflectance and a high spectral transmittance, with respect to light of a specific wavelength. It has also been ascertained by the experiments that, when R is less than 0.4, the difference between the spectral reflectances which the cell exhibits when a voltage is applied and not applied to the liquid crystal layer, and the difference between the spectral transmittances which the apparatus exhibits when a voltage is applied and not applied to the liquid crystal layer, decrease, thus reducing the contrast of the display.

Therefore, according to the present invention, R has a value ranging from 0.4 to 0.8, and more preferably ranging from 0.6 to 0.8. Since R is 0.4 to 0.8, the spectral transmittance of the background color generated by interference phenomenon of the light passing through, or reflected from the liquid crystal layer can be uniformed in the visible range. As a result, the background color is colorless. Thus, when a selective voltage is applied to liquid crystal layer, the front and rear polarizers cooperate to display black image on the white background. This has been proved, by experiments, to take place in the test apparatus embodying the present invention.

As has also been evidenced by the experiments, when the value R' of the optical retardation member ranges from 0.22+0.55m to 0.42+0.65m or from 0.47+0.55m to 0.67+0.65m (m=0, 1, or 2), the blackness is improved to lower the black level in the field-on or field-off state and the white level is improved in the field-off or field-on state. The value R' preferably ranges from 0.22 to 0.42 or from 0.47 to 0.67.

BRIEF DESCRIPTION OF THE DRAWINGS

FIG. 3 is a graph illustrating how the relationship between the spectral transmittance of the cell and the wavelength of the light passing through the cell depends upon the voltage applied to a liquid-crystal layer;

FIG. 4 is a sectional view showing a liquid-crystal display apparatus according to a second embodiment of the invention;

DETAILED DESCRIPTION OF THE PREFERRED EMBODIMENTS

The preferred embodiments of the invention will now be described, with reference to the drawings attached hereto.

Figure 1:
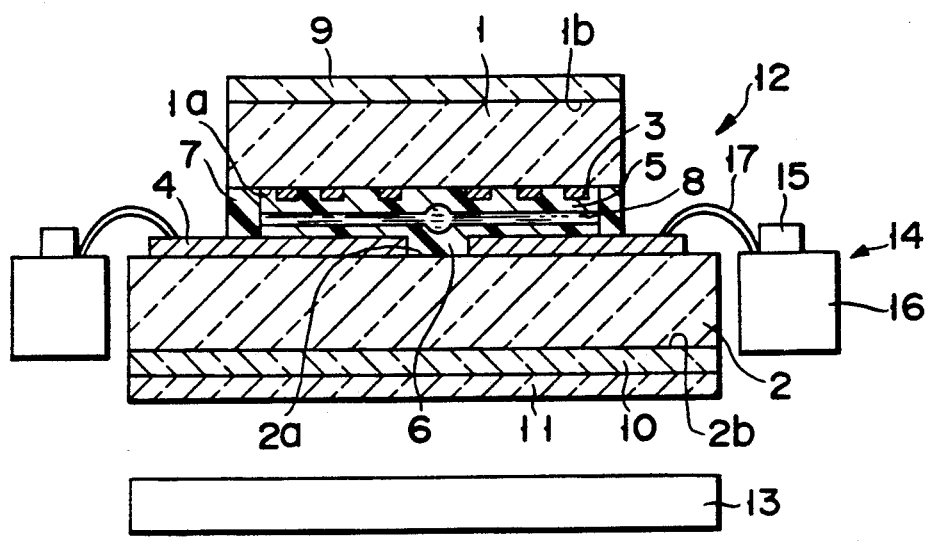
FIG. 1 is a sectional view showing a liquid-crystal display apparatus according to a first embodiment of the present invention.

FIG. 1 is a sectional view illustrating liquid-crystal display apparatus 12 according to a first embodiment of the invention. As is shown in FIG. 1, apparatus 12 comprises first substrate 1 and second substrate 2, both made of, for example, glass. Transparent electrodes 3 are formed on first major surface 1a of first substrate 1. Similarly, transparent electrodes 4 are formed on first major surface 2a of second substrate 2. Electrodes 3 and 4 are made of, for example, ITO (Indium Tin Oxide). Substrates 1 and 2 are parallel, and set apart for about 7.0 $\mu$, such that their first major surfaces 1a and 2a oppose each other. First aligning layer 5 is formed on first major surface 1a of first substrate 1, covering transparent electrodes 3. Second aligning layer 6 is formed on first major surface 2a of second substrate 2, covering transparent electrodes 4. Sealing member 7 is made of, for example, an adhesive which hardens when applied with ultraviolet rays adheres both first and second substrate 1, 2, thus defining a closed space. This space is filled with nematic liquid crystal material 8. The nematic liquid crystal material 8 contains a chiral agent formed of, for example, S811 (trade mark: produced by Merk Co.). The molecular axis of liquid crystal material 8 twists by 180° to 360° from first substrate 1 to second substrate 2. For instance, this axis can twist counterclockwise by 200°. Further, by virtue of aligning layers 5 and 6, the molecules of liquid crystal material 8 are pre-tilted by an angle – of more than 1°, i.e., about 10°, with respect to first and second major surfaces 1a and 2a of substrates 1 and 2. Liquid crystal material 8 has an optical anisotropy $\Delta n$ of approximately 0.094. The value of R, or $\Delta n \cdot d \cdot \cos^2 \theta$, ranges from 0.4 to 0.8. First neutral polarizer 9 is attached on second major surface 1b of first substrate 1. Optical retardation plate 10 made of, for example, a birefringent resin (i.e., polycarbonate, polyvinyl alcohol, etc.) is formed on second major surface 2b of second substrate 2. Second neutral polarizer 11 is formed on optical retardation plate 10.

Polarizers 9 and 11 are positioned such that their polarizing axes are rotated clockwise by about 80° and about 45°, respectively, with respect to the aligning direction of first aligning layer 5. This specific positional relationship between polarizers 9 and 11 sets the apparatus substantially to the blue mode.

The value of R', or $\Delta n' \cdot d'$, ranges from 0.22+0.55m to 0.42+0.65m, or from 0.47+0.55m to 0.67+0.65m, where $\Delta n'$ is the optical anisotropy of optical retardation plate 10 arranged between the polarizers 9 and 11 and d' ($\mu$m) is the thickness of optical retardation plate 10. When m=0, the value of R' is 0.32, exactly half-way between 0.22 and 0.42. The elongated direction of optical retardation plate 10 is placed clockwise by about 110° with respect to the aligning direction of first aligning layer 5.

As is shown in FIG. 1, liquid-crystal display apparatus 12 further comprises light-source 13 and two drive circuits 14. Light source 13 is located behind the optical retardation plate 10. Light source 13 is either an EL (Electroluminescence) lamp or a combination of an incandescent lamp or a fluorescent lamp and a light guiding plate, and applies light uniformly onto the entire surface of second polarizer 11. Two drive circuits 14 are located at the sides (i.e., the left and right sides, in FIG. 1). Either drive circuit comprises circuit board 16 and electronic components 15 mounted on board 16. Both circuits 14 are electrically connected to transparent electrodes 4 formed on second substrate 2, by means of connectors 17 such as flexible sheets.

Figure 2:
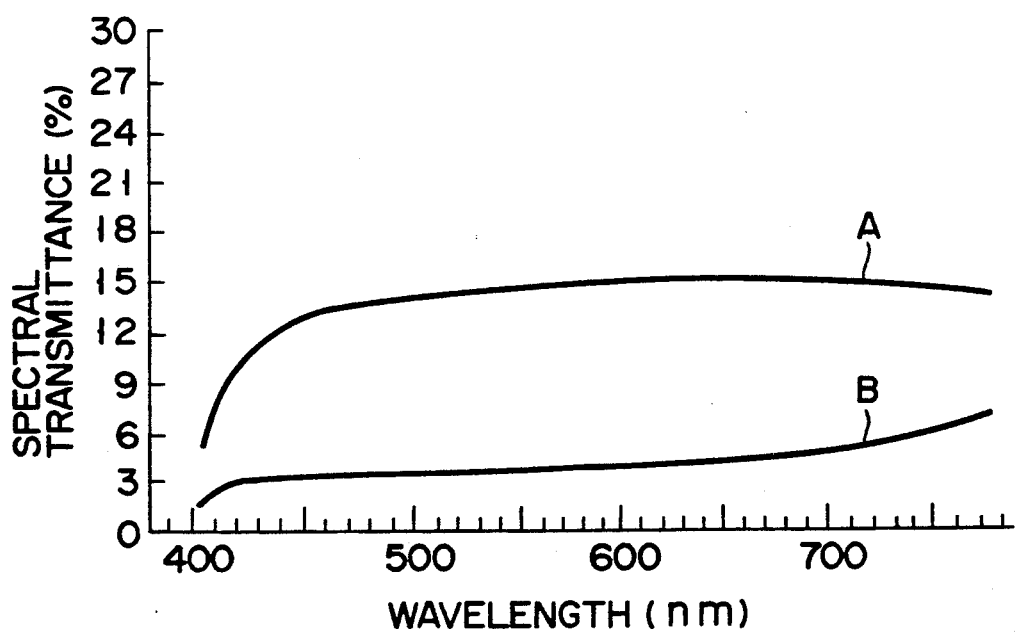
FIG. 2 is a graph representing the relationship between the wavelength of the light passing through a liquid crystal cell shown in FIG. 1 and the spectral transmittance.

FIG. 2 is a graph representing the spectral transmittance of the LCD cell. In this graph, the curve A shows the spectral transmittance when no voltage is applied to the layer of liquid crystal material 8, whereas the curve B shows the spectral transmittance when a voltage is applied to the layer of liquid crystal material 8. As is evident from FIG. 2, the spectral transmittance of the background color of the transmitting light, generated by interference phenomenon, is virtually made constant to give a monochrome display. On the other hand, when a selective voltage is applied to the liquid-crystal layer, and the polarizing axes of first and second polarizers 9 and 11 intersect with each other, the spectral transmittance is complemented by optical retardation plate 10. As a result, the spectral transmittance becomes almost constant to give a black display. Here, the color coordinates (x, y) of the background color is (0.321, 0.343), and that (x, y) of the display color is (0.330, 0.347). Obviously, the liquid-crystal display apparatus 12 give the black display on the white background.

As a result, the difference caused by its unavoidable display color of the conventional liquid-crystal display in visuality between the users can be neglected. Further, since both the background color and display color are monochromatic, no color-nonuniformity occurs even if the thickness d of the liquid-crystal layer changes. No color changes take place even when the user looks at the display from a different angle or even when the ambient temperature varies.

Apparatus 12 can achieve color display, with a high color-reproducibility and in a high image contrast, by arranging a color filter before or after polarizers 9 or 11, or on first major surfaces 1a or 2a of substrates 1 or 2.

FIG. 3 shows how the relationship between the spectral transmittance and wavelength of the light depends upon the voltage applied to the liquid-crystal layer. In this figure, the curve B represents how the transmittance varies with the wavelength when a selective voltage is applied to the liquid-crystal layer. The curve E indicates how the transmittance changes with the wavelength when non-selective voltage is applied to the liquid-crystal layer. The curves C and D show how the transmittance varies with the wavelength when voltages between the selective voltage and the non-selective voltage are applied to the liquid-crystal layer. As is clearly understood from FIG. 3, the spectral profiles of the relationships represented by the curves B, C, D, and E are almost identical; only the average transmittance differs in accordance with the voltage applied to the liquid-crystal layer. Hence, the gray scale display does not accompany the color change, and the gray scale changes from white level to black level. Liquid-crystal display apparatus 12 can accomplish better gray scale display than the conventional birefringent liquid-crystal display apparatuses. In particular, when apparatus 12 is used in combination with color filters, thus performing gray scale display (full color display), no color change occurs, unlike in the prior art liquid-crystal display apparatuses. Apparatus 12 can therefore achieve a full color display, with a high color reproducibility.

The present inventor performed experiments with a liquid-crystal display apparatus of the structure shown in FIG. 1 and described above, changing the value of R to evaluate the display qualities achieved with the different values of R. The results of the experiments were obtained as is shown in Table 1.

TABLE 1

| $\Delta n$ | d | $\theta$ | R | Whiteness of Background | Brightness of Background | Contrast Ratio |
|---|---|---|---|---|---|---|
| 0.08 | 4.0 | ~2 | ~0.32 | White | Low | Low |
| 0.08 | 5.0 | ~2 | ~0.4 | White | Low | Rather Low |
| 0.08 | 6.7 | ~18 | ~0.48 | ↑ | ↑ | ↓ |
| 0.08 | 6.7 | ~5 | ~0.53 | ↑ | ↑ | ↓ |
| 0.122 | 5.0 | ~2 | ~0.6 | ↑ | ↑ | ↓ |
| 0.094 | 7.0 | ~10 | ~0.64 | ↑ | ↑ | ↓ |
| 0.104 | 6.7 | ~2 | ~0.7 | ↑ | ↑ | ↓ |
| 0.114 | 7.0 | ~2 | ~0.8 | Slightly Colored | High | High |
| 0.132 | 6.8 | ~2 | ~0.9 |  | High | High |

The term "display quality" means what is defined by the degree of whiteness of the background, the level of brightness of the background, and the contrast ratio of the liquid-crystal display apparatus of the structure identical to that shown in FIG. 1. This quality changes with the value R, which is determined by the optical anisotropy $\Delta n$ of nematic liquid crystal 8, the thickness d ($\mu$m) of the layer of liquid crystal 8, and the pretilt angle $\theta$ of liquid crystal 8. In Table 1, the arrows indicate the tendency of the respective items to change. As Table 1 clearly shows, the degree of background whiteness increases as R decreases. However, the contrast ratio and the level of background brightness decreases as the value of R decreases; in the worst case, light must be applied from behind the liquid-crystal display to compensate for the insufficiency of the background brightness. Moreover, the greater the value of R, the greater the degree to which the background is colored. As can be seen from Table 1, the liquid-crystal display apparatus provides satisfactory display quality when R ranges from 0.4 to 0.8, and excellent display quality when R falls within the range of 0.6 to 0.75. When R is less than 0.4, both the contrast ratio and the the level of the background brightness are too low, and the apparatus must be back-lighted. On the other hand, when R is greater than 0.8, the background is slightly colored, though the contrast ratio and the level of the background brightness are sufficiently high.

The value R' $(=\Delta n' \cdot d')$ of optical retardation plate 10 influences the display quality of the apparatus 12. When R' is 0.32, a monochrome display is obtained. Assuming that R' ranges from 0.22+0.55m to 0.42+0.65m, where m=0, the background is increasingly colored as R' approaches the lower limit of 0.22 or the upper limit of 0.42. The same holds true in the case where R' ranges or from 0.22+0.55m to 0.42+0.65m, where m=1 or 2. More precisely, in this case, the background is sufficiently achromatic when R' is exactly halfway between the limits, i.e., 0.92 or 1.52.

However, the greater the value of m, the more prominent color change the background undergoes when viewed in any direction inclined to the layer of liquid crystal 8. When m is 3 or more, the background is colored to an excessive degree, and liquid-crystal apparatus 12 can no longer be practical. The value of R', therefore, is most preferably about 0.32.

As has been pointed out, the molecular of liquid crystal 8 can be twisted by 180° to 360°. Preferably, the twist angle of the liquid-crystal molecules falls within a narrow range, from 210° to 270°. When the twist angle is less than 210°, the level of the background brightness is lower than required. On the other hand, when the twist angle is greater than 270°, the liquid crystal 8 exhibits hysteresis. The twist angle should best be about 270°, to provide adequate contrast ratio, sufficient level of background brightness, and required degree of background whiteness.

A modification (not shown) of display apparatus 12 will be described. This modification is different from apparatus 12 (FIG. 1) in the polarizing axes of polarizers 9 and 11 and the value of R'. More specifically, polarizers 9 and 11 are positioned such that their polarizing axes are rotated clockwise by about 135° and about 45°, respectively, with respect to the orientating direction of first substrate 1. This specific positional relationship between polarizers 9 and 11 sets the apparatus to the yellow mode. The value of R' of optical retardation plate 10 ranges from 0.47+0.5m to 0.67+0.6m. When m=0, the best value for R' is 0.57 which is exactly halfway between the limits of 0.4722 and 0.67. The elongated axis of optical retardation plate 10 is rotated clockwise by about 110° with respect to the aligning direction of first substrate 1. The liquid-crystal molecules are twisted counterclockwise by 270° from first substrate 1 to second substrate 2, and are pre-tilted by angle $\theta$ of 10°. Nematic liquid crystal material 8 used has optical anisotropy $\Delta n$ of 0.094. Hence, R=0.64, which value is identical to that of the liquid-crystal display apparatus shown in FIG. 1. The relationship between the spectral transmittance and the wavelength, which is observed in this modified liquid-crystal display apparatus, is the same as is shown in FIG. 2. Further, the spectral transmittance of the background color is virtually constant. The image can be displayed in black on the bright achromatic background.

Also in the modified apparatus, the value R' ($=\Delta n' \cdot d'$) of optical retardation plate 10 influences the display quality. When R' is 0.57, a monochromate display is given. Assuming that R' ranges from 0.47+0.55m to 0.67+0.65m, where m=0, the background is increasingly colored as R approaches the lower limit of 0.47 or the upper limit of 0.67. The same holds true in the case where R' ranges from 0.47+0.55m to 0.67+0.65m, where m=1 or 2. More precisely, in this case, the background is sufficiently white when R' is exactly halfway between the limits, i.e., 1.17 or 1.77. However, the greater the value of m, the more prominent color change the background undergoes when viewed in any direction inclined to the layer of liquid crystal material 8. When m is 3 or more, the background is colored to an excessive degree, and liquid-crystal apparatus 12 can no longer be practical. Thus, the best possible value for R' in the modified apparatus is about 0.57. As in the case of the apparatus shown in FIG. 1, the twist angle of the liquid-crystal molecules should better range from 210° to 270°, and most preferably be about 270°.

FIG. 4 is a sectional view showing a liquid-crystal display apparatus according to a second embodiment of the invention. In this figure, the same numerals are used to designate the similar or the same components as those shown in FIG. 1.

The apparatus shown in FIG. 4 is identical in structure to the apparatus of FIG. 1, except for the location of optical retardation plate 10. More specifically, optical retardation plate 10 is arranged between first substrate 1 and first polarizer 9. This apparatus can not only achieve the same advantages as the first embodiment (FIG. 1). But also can it reduce the nonuniformity of the background color, despite the non-uniform thickness of optical retardation plate 10, to a greater extent than the first embodiment wherein optical retardation plate 10 is located between second substrate 2 and second polarizer 11. The second embodiment therefore has great practical usefulness. The advantage resulting from the arranging optical retardation plate 10 between first substrate 1 and first polarizer 9, i.e., the reduction of color-nonuniformity, is prominent in the apparatus of a reflective type. However, the apparatus of a transmissive type has some degree of the advantage. This is because the apparatus of a transmissive type function also as the apparatus of a reflective type, since the ambient light is incident to the apparatus.

The following example is related to the case that the optical retardation member are composed of two or more plates.

Figure 5:
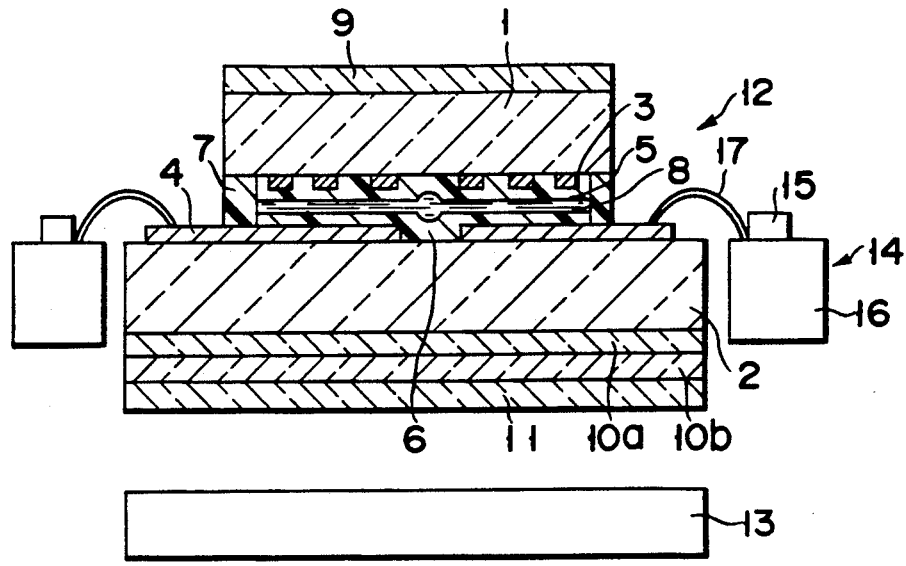
FIG. 5 is a sectional view illustrating a liquid-crystal display apparatus according to a third embodiment of this invention.

FIG. 5 is a sectional view illustrating a liquid-crystal display apparatus according to a third embodiment of this invention. This apparatus is characterized by the use of a combination of a optical retardation plate and a wave plate. More specifically, as is shown in FIG. 5, optical retardation plate 10a is formed on the lower surface of second substrate 2, and half-wave plate 10b is interposed between optical retardation plate 10a and second polarizer 11. Optical retardation plate 10a and half-wave plate 10b have the same value R' of about 0.32 $\mu$m, which is exactly halfway in the range of 0.22+0.55m to 0.42+0.65m, where m=0. The elongating axis of optical retardation plate 10a is located to rotate clockwise by about 110° with respect to the aligning direction of first substrate 1. The phase-advancing (or phase-lagging) axis of half-wave plate 10b is inclined at about 45° with respect to the light-absorption (or polarizing) axis of second polarizer 11.

Figure 6:
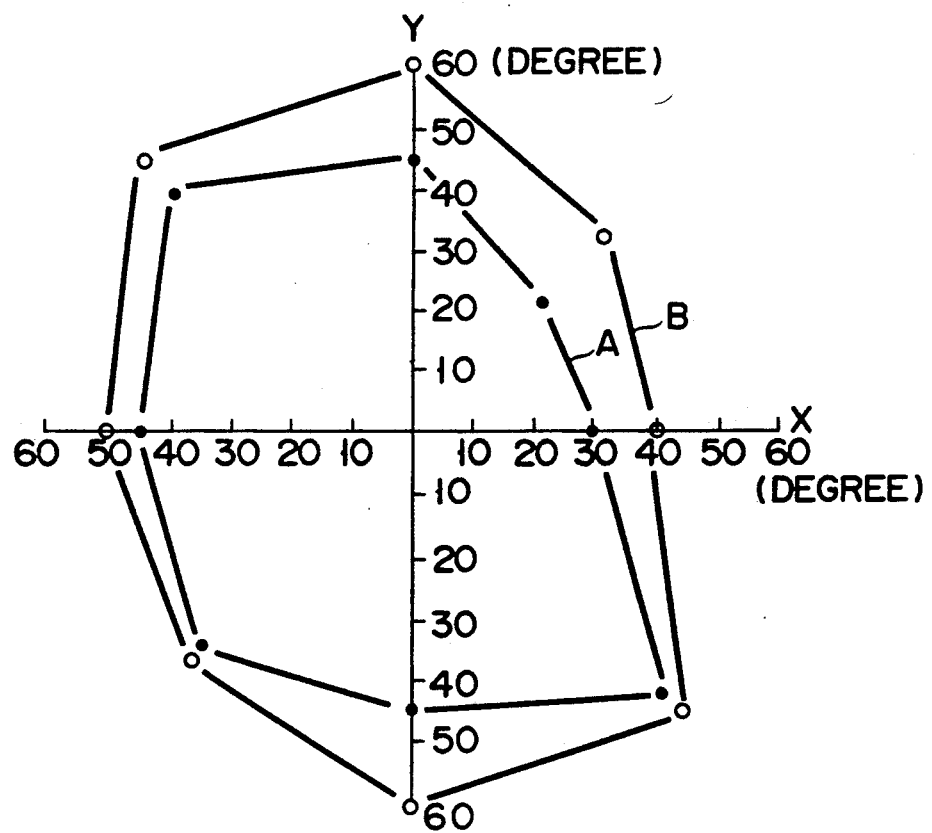
FIG. 6 is a graph representing the range of the viewing angle of the apparatus shown in FIG. 5, and also that of a liquid-crystal display apparatus which is different in part from the apparatus of FIG. 5.

FIG. 6 is a diagram representing the viewing angle range of the apparatus shown in FIG. 5, and also that of a liquid-crystal display apparatus which is different only in that no half-wave plate 10b are used. In FIG. 6, A indicates the viewing angle range of the apparatus without half-wave plate 10b, whereas B represents that of the apparatus shown in FIG. 6. The X axis and the Y axis of this diagram are substantially parallel to the aligning directions in which the major surfaces 1a and 2a of the substrates 1 and 2 have been rubbed. The viewing angles, plotted on both axes, are of the values measured from the line perpendicular to the display surface of liquid-display apparatus. As is evident from FIG. 6, the viewing angle range of the apparatus with half-wave plate 10b is broader than that of the apparatus without such a wave plate. In either liquid-crystal display apparatus, the spectral transmittance curve has the same configuration as is shown in FIG. 2, when viewed from the front of the apparatus. In other words, the transmittance-wavelength relationship does not depend upon whether a half-wave plate is used or not.

Table 2, given below, shows the relationship between the angle $\phi$ (°) and the degree of background whiteness, said angle $\phi$ defined by the angle between the phase-advancing (or phase-lagging) axis of half-wave plate 10b and the light-absorbing (or polarizing) axis of second polarizer 11.

TABLE 2

| Angle $\phi$ (°) | Whiteness of Background |
| --- | --- |
| 0 | Colored |
| ↑ | ↑ |
| 35 | Slightly Colored |
| 40 | ↑ |
| 45 | Not Colored |
| 50 | ↓ |
| 55 | Slightly Colored |
| ↑ | ↓ |
| 90 | Colored |

As can be understood from Table 2, when the angle $\phi$ is 45°, the background appears white or rather transparent when viewed from the front, and image displayed appears black. Further, the viewing angle range is relatively broad. When the angle $\phi$ ranges from about 40° to about 50°, a monochrome display can be essentially given, though the background looks slightly colored. When the angle $\phi$ falls outside this range (i.e., 40° to about 50°), the background is colored too much, in yellow, yellowish-green, blue, or purple, depending upon the values of R and R'. According to the direction in which the liquid-crystal molecules are orientated, the orientating direction of optical retardation plate 10, and the twisting angle of liquid-crystal molecules, the axis of half-wave plate 10b (the phase-advancing axis or phase-lagging axis) is selected as the reference line for measuring the angle $\phi$. As is seen from Table 2, it is desirable that the angle $\phi$ fall within the range of about 40° to 50°. The best value is about 45°.

Figure 7:
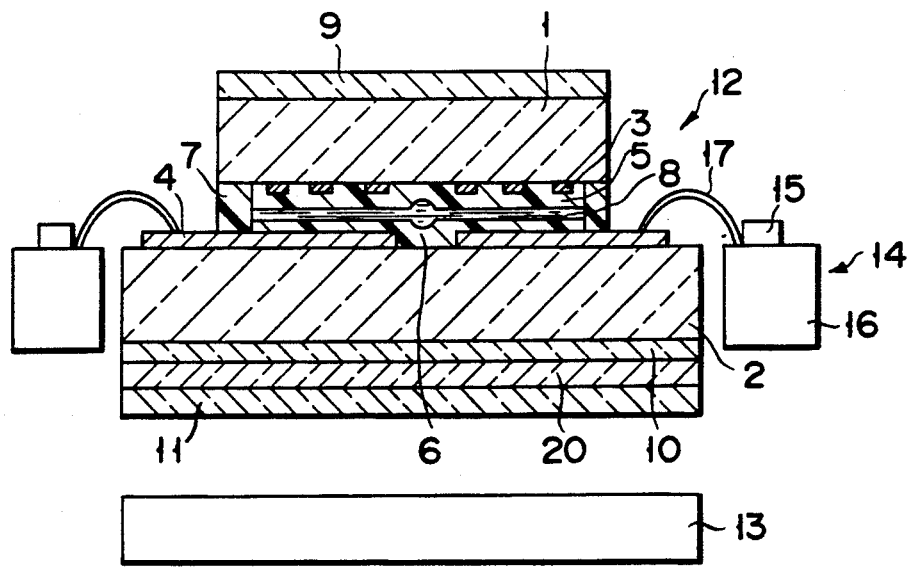
FIG. 7 is a sectional view showing a liquid-crystal display apparatus according to a fourth embodiment of the present invention.

FIG. 7 is a sectional view showing a liquid-crystal display apparatus according to a fourth embodiment of the present invention. This apparatus is identical to the third embodiment (FIG. 5), except that quarter-wave plate 20 is used in place of half-wave plate 10b. The value R' of quarter-wave plate 20 is approximately 0.16 μm. The phase-advancing (or phase-lagging) axis of quarter-wave plate 20 is inclined at about 45° with respect to the light-absorbing (or polarizing) axis of second polarizer 11, as in the embodiment illustrated in FIG. 5. The spectral transmittance curve has the same configuration as is shown in FIG. 2, when viewed from the front of the apparatus in either cases that a voltage is applied or not applied on the liquid-crystal layer. In other words, the transmittance-wavelength relationship does not depend upon whether or not quarter-wave plate is used or not.

Figure 8:
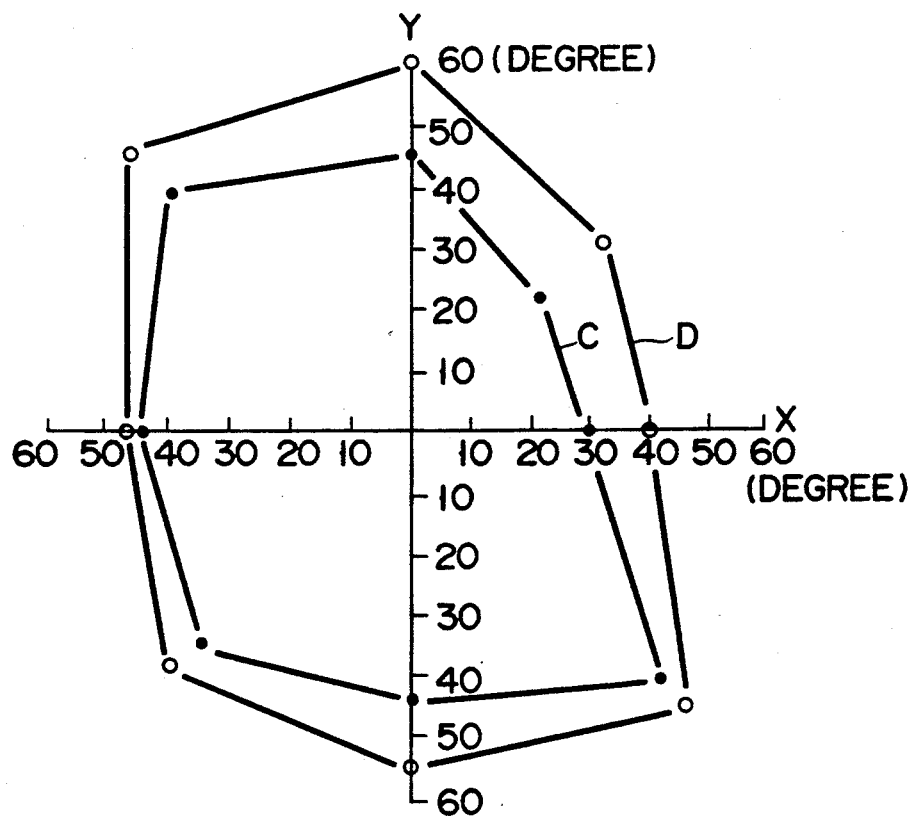
FIG. 8 is a graph representing the range of the viewing angle range of the apparatus shown in FIG. 7, and also that of a liquid-crystal display apparatus which is different in part from the apparatus shown in FIG. 7.

FIG. 8 is a diagram representing the viewing angle range of the apparatus shown in FIG. 7, which has includes quarter-wave plate 20, and also that of a liquid-crystal display apparatus which is identical to the apparatus shown in FIG. 7, except that no quarter-wave plate are provided. In FIG. 8, C represents the viewing-angle range of the apparatus without quarter-wave plate 20, and D indicates that of the apparatus (FIG. 7) with quarter-wave plate 20. As is from FIG. 8, the viewing angle range of the apparatus with quarter-wave plate 10b is broader than that of the apparatus without such a wave plate. Further, as comparison of FIGS. 8 and 6 may reveal, the viewing angle range achieved by the use of quarter-wave plate 20 is broader than that attained by the use of half-wave plate 10b. Furthermore, as in the third embodiment (FIG. 5), it is preferable that the angle $\phi$ range from about 40° to 50°, and the optimum value of this angle is about 45°.

According to the present invention, optical retardation plate 10 is not necessarily be arranged between first substrate 1 and first polarizer 9, or between second substrate 2 and second polarizer 11. Plate 10 can be located at any other position between polarizers 9 and 11. As long as optical retardation plate 10 is arranged between polarizers 9 and 11, the spectral transmittance is virtually invariable in the visible constant to give an excellent whiteness and blackness display.

Furthermore, according to this invention, first substrate 1 or second substrate 2 can be used not only as a substrate, but also as an optical retardation plate. In this case, too, the same advantages are achieved as in the embodiments described above.

In all embodiments described above, half-wave plate 10b or quarter-wave plate 20 is positioned to contact with optical retardation plate 10. Instead, either wave plate can be located near either first substrate 1 or second substrate 2. To reduce the color changes that occur when the display surface is viewed from different angles, it would be best, as has been proved experimentally, to arrange half-wave plate 10b or quarter-wave plate 20 in contact with optical retardation plate 10.

As has been explained, the present invention can provide a liquid-crystal display apparatus which can perform ideal monochrome display in such a way that the users can clearly recognize the display image, without the difference in their visibility. The apparatus according to the invention has a little color non-uniformity on its display surface, and can thus be manufactured with a high yield. Further, since the color changes very little with the viewing angle and the ambient temperature, the apparatus can accomplish excellent color display.

Moreover, the invention can apply to a liquid-crystal display apparatus of transmissive type, which can achieve a full-color and good gray scale, thus realizing good color reproducibility.

Still further, the liquid-crystal display apparatus according to the invention has only one additional component, i.e., an optical retardation member, as compared with the conventional liquid-crystal display apparatuses. Hence, it can be manufactured at relatively low cost despite its ability of performing high-quality display.

What is claimed is:
1. A liquid-crystal display apparatus comprising:
first and second substrates opposing each other and having electrodes formed on opposing surfaces thereof, at least one of the electrodes being transparent;
a nematic liquid crystal layer interposed between said first and second substrates and having a pre-tilt angle $\theta$ of greater than 1° with respect to the surfaces of said first and second substrates ,and having a twist angle of 180° to 360° from said first substrate to said second substrate;
a first polarizer arranged on that side of said first substrate which faces away from the electrodes formed thereon;

a second polarizer arranged on that side of second substrate which faces away from the electrodes formed thereon; and an optical retardation member located between said first and second polarizers, wherein a value of $R = \Delta n \cdot d \cdot \cos^2\theta$ ranges from 0.4 to 0.8, where $\Delta n$ is an optical anisotropy of a material of said nematic liquid crystal layer, d is a thickness of said liquid crystal layer in $\mu m$, and $\theta$ is the pre-tilt angle of said liquid crystal layer, and a value of $R' = \Delta n' \cdot d'$ ranges from $0.22 + 0.55m$ to $0.42 + 0.65m$, or from $0.47 + 0.55m$ to $0.67 + 0.65m$ (m = 0, 1, or 2), where $\Delta n'$ is the optical anisotropy of said optical retardation member and d' is the thickness of said optical retardation member in $\mu m$.

2. An apparatus according to claim 1, wherein said optical retardation member performs the function of an optical retardation plate.

3. An apparatus according to claim 1, wherein said optical retardation member is an optical retardation plate.

4. An apparatus according to claim 1, wherein said optical retardation member comprises an optical retardation plate and a half-wave plate.

5. An apparatus according to claim 1, wherein said optical retardation member is arranged either between said electrodes formed on said first substrate and said first polarizer, or between said electrodes formed on said second substrate and said second polarizer.

6. An apparatus according to claim 1, wherein R ranges from 0.6 to 0.8.

7. An apparatus according to claim 1, wherein R' ranges from 0.22 to 0.42, or from 0.47 to 0.67.

8. An apparatus according to claim 1, wherein the twist angle of said nematic liquid crystal ranges from 210° to 270°.

9. An apparatus as in claim 1, wherein said pre-tilt angle is greater than 1° but no more than 18°.

10. An apparatus as in claim 1, wherein said nematic crystal layer further comprises aligning layers for setting said pre-tilt angle $\theta$ at said value greater than 1° with respect to the surfaces of said first and second substrates.

11. A liquid-crystal display apparatus comprising: first and second substrates opposing each other and having electrodes formed on opposing surfaces thereof, at least one of the electrodes being transparent;

a nematic liquid crystal layer interposed between said first and second substrates and having a pre-tilt angle $\theta$ of greater than 1°, with respect to the surfaces of said first and second substrates, and having a twist angle of 180° to 360° from said first substrate to said second substrate;

a first polarizer arranged on that side of said first substrate which faces away from the electrodes formed thereon;

a second polarizer arranged on that side of said second substrate which faces away from the electrodes formed thereon; and an optical retardation member and a quarter-wave plate, each located between said first and second polarizers, wherein a value of $R = \Delta n \cdot d \cdot \cos^2\theta$ ranges from 0.4 to 0.8, where $\Delta n$ is an optical anisotropy of a material of said nematic liquid crystal layer, d is a thickness of said liquid crystal layer in $\mu m$, and $\theta$ is the pre-tilt angle of said liquid crystal material, and a value of $R' = \Delta n' \cdot d'$ ranges from $0.22 + 0.55m$ to $0.42 + 0.65m$, or from $0.47 + 0.55m$ to $0.67 + 0.65m$ (m = 0, 1, or 2), where $\Delta n'$ is an optical anisotropy of said optical retardation member and d' is a thickness of said optical retardation member in $\mu m$.

12. An apparatus according to claim 11, wherein said optical retardation member performs the function of an optical retardation plate.

13. An apparatus according to claim 11, wherein said optical retardation member is an optical retardation plate.

14. An apparatus according to claim 11, wherein said optical retardation member is arranged either between first electrodes formed on said first substrate and said first polarizer, or between second electrodes formed on said second substrate and said second polarizer.

15. An apparatus according to claim 11, wherein R ranges from 0.6 to 0.8.

16. An apparatus according to claim 11, wherein R' ranges from 0.22 to 0.42, for from 0.47 to 0.67.

17. An apparatus according to claim 11, wherein the twist angle of said nematic liquid crystal ranges from 210° to 270°.

18. An apparatus as in claim 11, wherein said pre-tilt angle is greater than 1° but no more than 18°.

19. An apparatus as in claim 11, wherein said nematic crystal layer further comprises aligning layers for setting said pre-tilt angle $\theta$ at said value greater than 1° with respect to the surfaces of said first and second substrates.

* * * * *